Sept. 8, 1931.    L. A. GEBHARD    1,822,618
HIGH POWER RECTIFIER SYSTEM
Filed Nov. 7, 1927
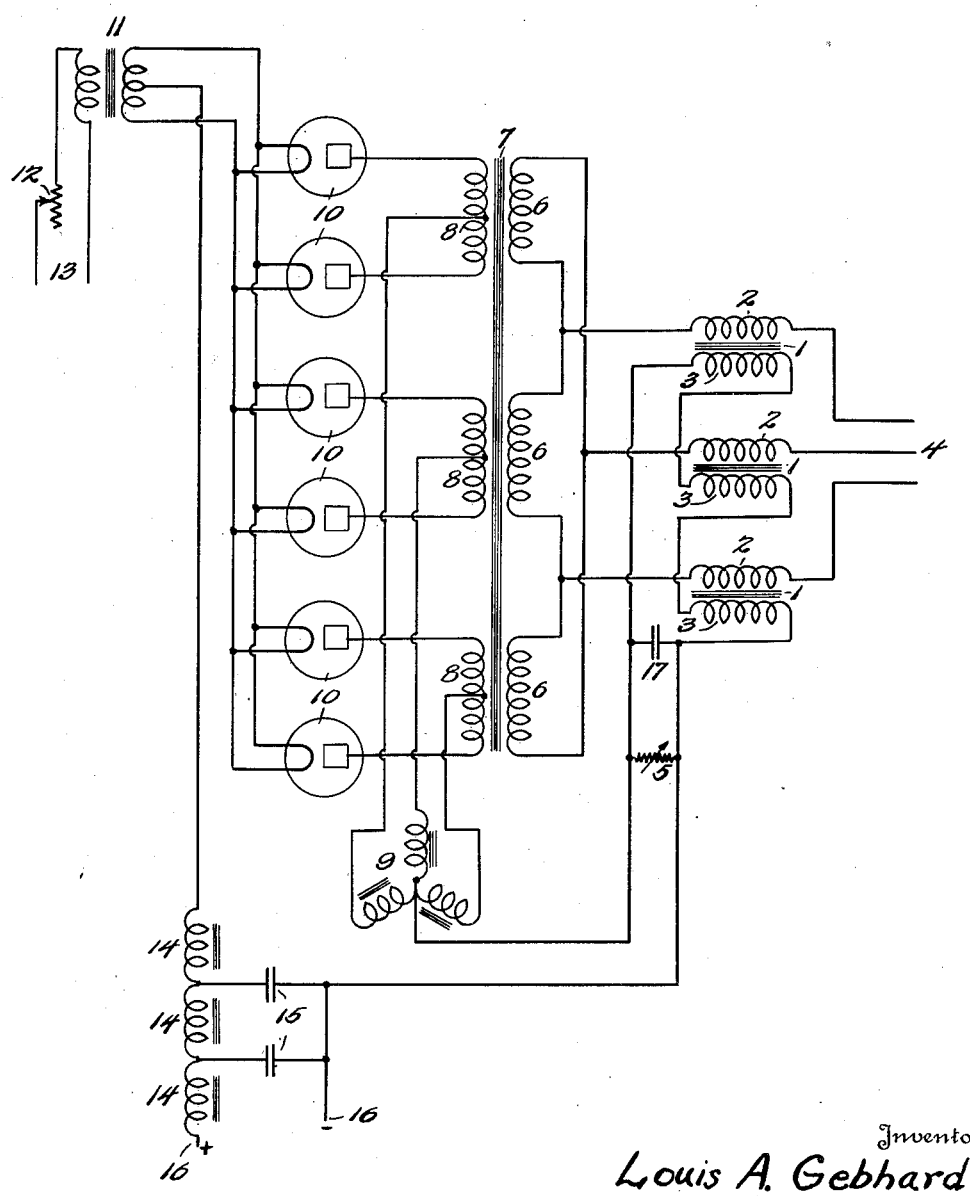
Inventor
Louis A. Gebhard
By Harold Dodd,
Attorney Patented Sept. 8, 1931

1,822,618

UNITED STATES PATENT OFFICE

LOUIS A. GEBHARD, OF WASHINGTON, DISTRICT OF COLUMBIA, ASSIGNOR, BY MESNE ASSIGNMENTS, TO FEDERAL TELEGRAPH COMPANY, A CORPORATION OF CALIFORNIA

HIGH POWER RECTIFIER SYSTEM

Application filed November 7, 1927. Serial No. 231,606.

My invention relates broadly to rectifying systems and more particularly to a vacuum tube rectifying circuit arrangement.

One of the objects of my invention is to provide a circuit arrangement for a rectifying system wherein a constant supply voltage may be maintained at the output terminals of the rectifier under conditions of varying load.

Another object of my invention is to provide a voltage regulation circuit for use in connection with high power rectifiers used in the supply of high potentials to the circuits of vacuum tube radio transmitters.

Other and further objects of my invention will be pointed out in the specification hereinafter following by reference to the accompanying drawing which shows the wiring arrangement for the rectifying system of my invention.

It is important to maintain the high voltage power supply for a radio transmitter at as constant a value as is possible to reduce transient voltages to a minimum, thus prolonging tube life and where a number of transmitters are supplied from a common source to prevent intermodulation of sets and permit full power output under all conditions. The vacuum tube rectifier, although having inherently bad regulation, has other qualities which are highly desirable for supplying a radio transmitter load. The circuit arrangement of my invention permits the use of the rectifier under conditions which would make operation otherwise impracticable.

The drawing shows a wiring diagram of a rectifier to which the improvement of my invention has been applied. The rectifier shown is of the so-called triple T type, using a three phase interphase transformer 9. The "plate" transformer may be a three phase transformer or consist of three single phase transformers. The primaries 6 are connected in delta. The secondaries 8 have center taps which connect to interphase transformer 9. The outer terminals of secondaries 8 connect to anodes of rectifier vacuum tubes 10. The filaments of tubes 10 are connected in parallel and to secondary of transformer 11 to the primary of which is supplied from A. C. source 13, through the voltage control resistance 12. Reactors 14 and condenser 15 form a filter to smooth out voltage irregularities. The direct current load is taken from terminals 16.

My invention resides in inserting windings 2 of iron core reactors 1 in series with the supply lines 4 to primaries 6 of "plate" transformer 7. The reactors 1 have other windings 3, which are connected in series with each other and in series with the direct current output circuit of the rectifier. As shown in the drawing, these reactor windings 3 are inserted between the interphase reactor and direct current output terminals 16. It is obvious that they may be inserted anywhere in series with the direct current output circuit. An adjustable shunt resistance 5 is shown and this acts to control the current through the reactor winding 3. It will be understood that resistance 5 is not absolutely necessary as adjustment may be accomplished by changing the number of turns of the reactor winding 3.

The reactors are so designed that the magnetizing force produced by the direct current output tends toward saturation of the iron core, causing a decrease in reactance of the reactor windings in series with the primary transformer 7. This results in an increase in primary voltage of transformer 1 with resultant increase in secondary voltage and therefore direct current voltage. This increase compensates for the voltage drop due to the load and tends to hold the direct current terminal voltage constant.

There is a voltage induced in the windings 3 of reactors 1, due to the alternating current drop across the winding 2. If this voltage were present at the direct current output terminals, it would be objectional. It will be seen that windings 3 are in series and if they are connected with proper regard to polarities, the three phase voltages induced in them will add up to zero, provided the voltages are properly balanced at the line terminals, for the rectifier is a balanced load. There may be some unbalance in voltages of the fundamental frequency present at terminals of series connection of windings 3; also there may be harmonics present at these terminals which are not balanced out. In order to reduce the effect of these to a minimum condenser 17 is provided.

It will be understood that my invention may also be utilized in instances where a type of load other than a radio transmitter must be energized and where good regulation is imperative and that the description of my invention in connection with radio transmission is merely for the purpose of explaining the nature of my invention.

What I claim as new and desire to secure by Letters Patent of the United States is as follows:

1. A rectifier system comprising an alternating current power supply circuit, a load circuit, rectifying means interposed between said power supply circuit and said load circuit, and reactors interposed between said load circuit and said power supply circuit, means inductively related to said reactors for decreasing the reactance in said power supply circuit as the load on the load circuit is increased and impedances connected in shunt with said reactors for determining the effect of said reactors on said means in accordance with the load.

2. A rectifier system including a three phase power supply circuit, a load circuit, a plurality of two-electrode rectifier tubes, a plurality of transformers each having primary and secondary windings with the primary windings thereof each supplied with energy from one phase of said power supply circuit, connections between opposite terminals of said secondary windings and one electrode of each of said rectifier tubes, an interphase transformer having one winding thereof connected to a mid point in each of said aforementioned secondary windings, means coupled to each phase of said power supply circuit and a series circuit extending from a common point on each of the windings of said interphase transformer and said load circuit, whereby, variations in the characteristic of said load operate to change the potential impressed across said rectifier tubes.

3. A rectifier system comprising a three phase power supply circuit, reactances connected in each phase of said power supply circuit, an inductance individually coupled with each of said reactances, a series circuit connecting said inductances, a polyphase transformer system, rectifiers connected into each phase of said polyphase transformer system, a load circuit, connections between said series circuit, said rectifiers, and said load circuit for controlling the potential supplied to said rectifiers in accordance with the characteristics of said load and a variable impedance connected in shunt with said series circuit for controlling the effect of the inductances in said series circuit upon said reactances in said power supply circuit in accordance with variations in the load.

4. A rectifying system comprising a polyphase power supply circuit, transformers connected in each phase of said polyphase power supply circuit, rectifiers connected to each of said transformers, a polyphase reactance system connected to intermediate points in each of said transformers, a load circuit, a connection between one side of said load circuit and the output of said rectifier system, and a connection between the other side of said load circuit with a common point in said aforementioned reactance system, said connection including a series circuit coupled to each phase of said power supply circuit, whereby regulation may be maintained between the power supply circuit and said load circuit.

LOUIS A. GEBHARD.